July 20, 1926.
C. F. WALLACE
1,593,109
CHEMICAL DOSING APPARATUS
Filed March 6, 1924
2 Sheets-Sheet 1
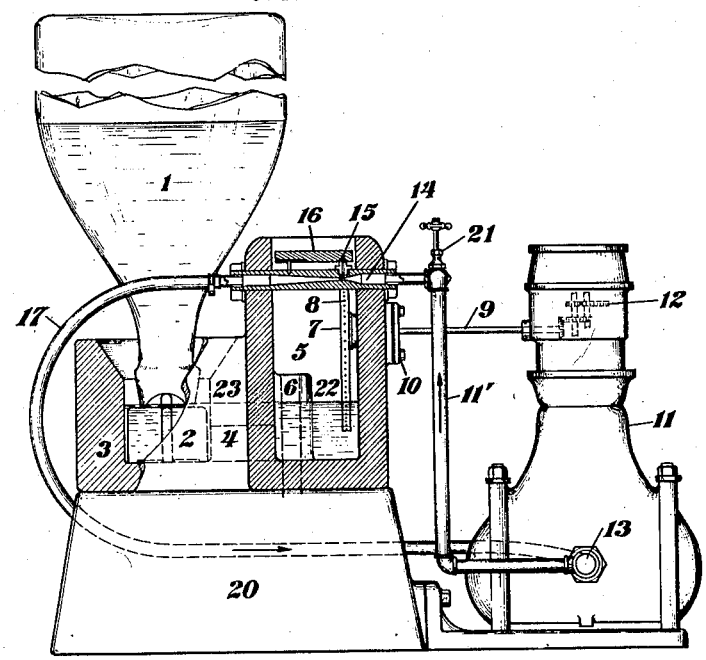
Fig. I
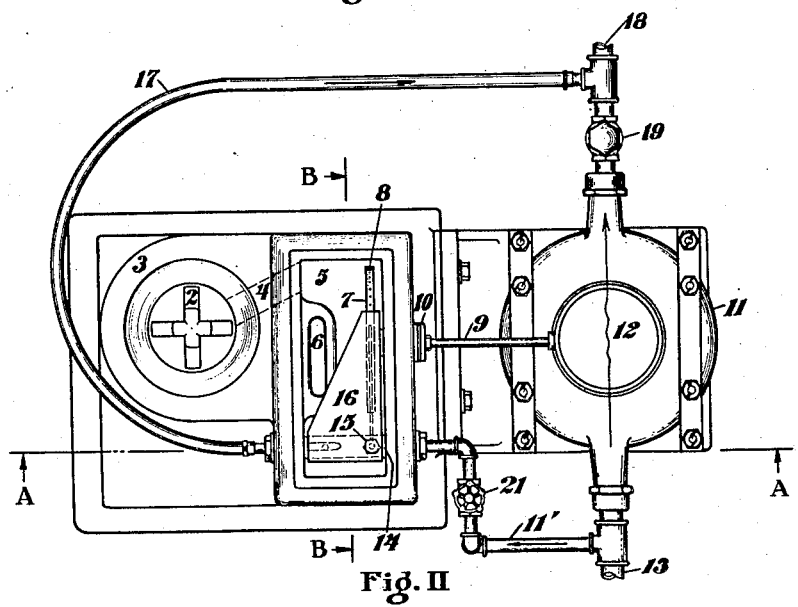
Fig. II
INVENTOR
Charles F. Wallace
BY Cooper, Kerr & Dunham
ATTORNEYS

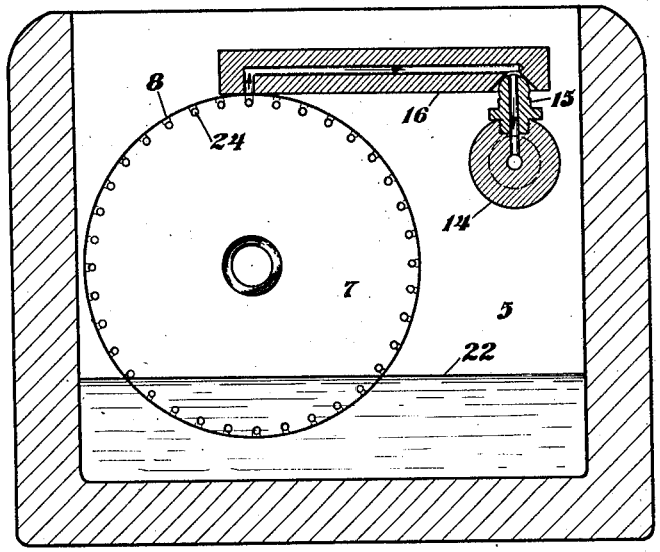
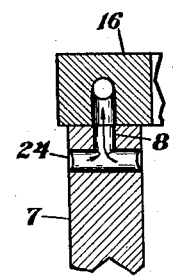
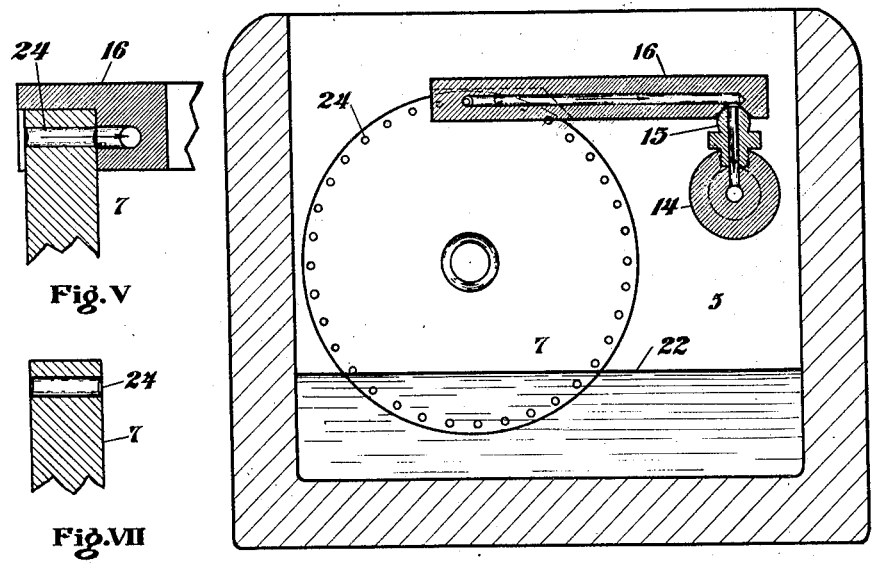

Patented July 20, 1926.

1,593,109

UNITED STATES PATENT OFFICE.

CHARLES F. WALLACE, OF WESTFIELD, NEW JERSEY, ASSIGNOR TO WALLACE & TIERNAN PRODUCTS, INC., OF NEWARK, NEW JERSEY, A CORPORATION OF NEW JERSEY.

CHEMICAL DOSING APPARATUS.

Application filed March 6, 1924. Serial No. 697,307.

As illustrative of the art to which the invention, which forms the subject of my present application for Letters Patent, relates, I may refer to the now widely practiced method of purifying water which consists in adding to a flow of untreated water a relatively minute quantity of some chemical in solution, such as sodium hypochlorite, or other desired reagent. In this method which is typical of all those to which my invention is applicable, it is manifestly of prime importance that the dose or doses of chemical introduced into the water or other liquid should be constant or proportional to the flow under all circumstances and in condition to thoroughly mix with the larger flow.

I have devised an apparatus, known in the art as a chemical dosing device, which renders this easy of accomplishment, which is or may be entirely automatic in operation and operative only where required and in general under perfect control.

Broadly stated, this apparatus comprises what may be termed a conveyor and which is by preference a member in the form or nature of a disk partly submerged in a body of the chemical solution employed and which is rotated at a speed proportionate to the flow of the water to be treated for which purpose it is most advantageously driven by or at a speed proportional to that of a meter through which the untreated water passes. The function of this conveyor is to take up from the body of the solution a limited quantity of the same at a uniform rate in such manner that at some point above the level of the solution it may be taken off from the conveyor and delivered to the body of the water under treatment, or in general to the point of application.

In practice I accomplish this by means of a rotary disk partly immersed in the solution and provided at or near its periphery with capillary holes or recesses. These take up very small quantities of the fluid which is retained in them by capillary attraction or surface tension and at a proper point above the solution it is removed from the disk by means of such a device as an aspirator and forced into the flowing body of water.

As the amount of solution thus added to the water should be always proportional to the total amount of the water to be treated, it is not only necessary that the disk be revolved at a speed strictly proportional to the flow of the water, it is also necessary to maintain the solution in which the disk revolves at a level high enough to cover the recesses in the disk in order to fill them, and to remove the solution from the disk I employ an aspirator to withdraw it by suction, and this aspirator I operate by a given portion of the main flow of water at a proper pressure.

The apparatus in the best form in which I have devised it is illustrated in the accompanying drawing in which:

Fig. 1 is a view in elevation and part section through A—A of Fig. 2 of the complete apparatus.

Fig. 2 is a plan view of the same.

Fig. 3 is a section on line B—B of Fig. 2 showing the suction take off on the side of the disk.

Fig. 4 is a similar section showing a modification of the recesses in the disk.

Fig. 5 is a sectional detail of the suction member as shown in Fig. 4.

Fig. 6 is a similar view showing the application of the suction member of Fig. 3, and Fig. 7 is an enlarged detail of a portion of the disk with side recesses.

The apparatus is mounted upon a suitable base 20 and comprises as its most essential parts a container 1 for a solution of the chemical used and which is, preferably, in the nature of an inverted bottle resting upon a proper form of support 2 in a receptacle 3 which is connected by a duct 4 with a chamber 5. It is desirable that this chamber or tank be provided with an overflow 6 at a proper level.

On a shaft 9 passing through a bearing 10 in the side wall of the chamber 5 there is mounted a disk 7 having at or near its peripheral edge a series of small recesses or holes 8. The shaft 9 is adapted to be rotated, preferably by engagement with the gears 12 of a water meter 11, which, for reasons more fully hereinafter explained, is the best and most convenient source of power for this purpose.

By means of a pipe 11' running from the main flow pipe 13 water under the pressure of the main flow is carried to an aspirator 14, which causes a suction through the member 15 communicating with a passage through the part 16 suitably constructed and set so as to lie in contact with the disk 7, in line with the recesses or holes therein.

From the aspirator 14 a discharge pipe 17 leads back to a coupling 18 in the main flow pipe 13 on the opposite side of the meter 11. Between this coupling and the meter is a back pressure valve 19 set to maintain a differential pressure sufficient to operate the aspirator 14, and the connecting pipe 11′ contains a valve 21 for controlling the flow of water going to and operating the aspirator 14.

The operation of the apparatus is as follows: The container 1 being filled with the proper solution, the receptacle 3 and communicating chamber 5 are filled to a certain level 22 by the inverted bottle action of the container. The water to be treated flowing from the source through the pipe 13 in the passage through the meter 11 operates the gear train 12 and from this train rotation is imparted to the disk 7 by the shaft 9, this rotation being manifestly in direct proportion to the flow of water.

As the disk revolves through the solution in the tank 5 the recesses in its edge or sides become filled and the liquid, retained therein by capillary attraction or surface tension, is carried around with the disk. As the recesses come under the action of the negative head of the aspirator the liquid is sucked out of the recesses and forced to the desired point of its application or use, that is to say, back into the line of flow of the water which has driven the meter, the pressure in which has been reduced by the valve 19, or to any other desired point.

Variation of the amount or proportion of solution thus applied may be secured by a variation of the size of the holes in the disk 7, or the number of holes in a given area, or the speed of the disk, or by the width or number of disks used.

I have shown a water meter as the source of motive power for rotating the disk 7, and this I have found most convenient, as by such means greater ease and perfection of adjustment of the proportional amount of solution to the total amount of the flow of water are secured. Where other means for driving the disk are used, and such means are manifestly permissible under my invention, the rate of application of the solution may be maintained constant or may be variable depending upon the rate of rotation which is imparted to the disk.

The location and character of the solution retaining recesses or equivalent means for taking up the solution by the rotation of the disk 7 are not of the essence of the invention as these may be greatly varied. In Figs. 4 and 6, for example, I have shown transverse holes 24 connecting with the radial holes 8 in the periphery of the disk. In such case the passage in the member 16 passes over the periphery in the line of the holes 8.

Transverse holes 24 only may be used, as shown in Figs. 3, 5 and 7, in which case the opening of the passage in member 16 slides over one side of the disk in the line of the holes 24.

This device has been found most useful in the application of minute quantities of solution to liquids where the proportions of such supply to the flow are to be considered, such as in the purification of water by sodium hypochlorite, alum, or other water treating solutions. The apparatus, moreover, lends itself to the use of materials which are practically resistant to corrosive solutions, such as acids.

The specific form or construction of the apparatus may be widely varied, and in the main it is obvious that it is the function rather than the character of the elements described which are important. For example, it would be within the invention to use some other means for removing the solution from the disk than the aspirator which I have shown and described.

What I claim is:—

1. In an apparatus of the kind herein described, the combination with a receptacle for containing a chemical solution, a rotary disk partly immersed in said solution and containing capillary recesses in or at its periphery which are filled by capillary action in passing through the solution and means for removing the solution from such recesses after they have passed out of the main body of such solution and means for conducting the solution thus removed to its point of application.

2. In an apparatus of the kind herein described, the combination with a receptacle for containing a chemical solution, of a disk partially submerged therein and containing at or near its periphery a series of capillary recesses, means for rotating the disk constructed to take up and retain portions of the solution, means for removing the solution from the recesses and means for conducting it to its point of application.

3. In an apparatus of the kind herein described, the combination with a receptacle for containing a chemical solution at a constant level, of a disk partially submerged in the solution and containing at or near its periphery a series of capillary recesses which are filled while beneath the surface of the solution, means for rotating the disk, means for removing the solution from the recesses at a point above the level of the solution and means for applying the removed solution to a liquid to be treated.

4. In a chemical dosing apparatus for treating a body of flowing water, the combination with a receptacle for containing a chemical solution, of a partly submerged disk having a series of capillary recesses near its edge, a meter operated by the flow of the water to be treated, connections therefrom to and adapted to rotate the disk, means for removing the solution from the capillary recesses at a point above the level of the solution, and means for introducing such removed solution into the water to be treated.

5. In a chemical dosing apparatus for such purposes as treating a body of flowing water, the combination with a receptacle for containing a chemical solution, of a disk partly submerged therein and provided with a series of capillary recesses near its edge, a meter operated by the flowing water and connected with and rotating the disk, an aspirator for removing by suction the solution from the capillary recesses in the disk and connections therefrom to the point of application of the removed solution.

6. In a chemical dosing apparatus for such purposes as treating a body of flowing water, the combination with a body of a chemical solution, a disk partly submerged therein and containing a series of capillary recesses near its edge, a meter for measuring the flow of the water connected with and rotating the disk, an aspirator operated by the flow of a part of the main flow for removing by suction the solution from the capillary recesses and a connection from the same back to the main flow.

7. In an apparatus of the character described, the combination with a receptacle for containing a chemical solution, of a disk rotatable with a part of its periphery running in the solution and having said periphery provided with means for taking up and retaining small quantities of the solution, and devices for removing the solution by suction from said means and conducting it to the point of application of the removed solution.

In testimony whereof I hereto affix my signature.

CHARLES F. WALLACE.